Figure 4:
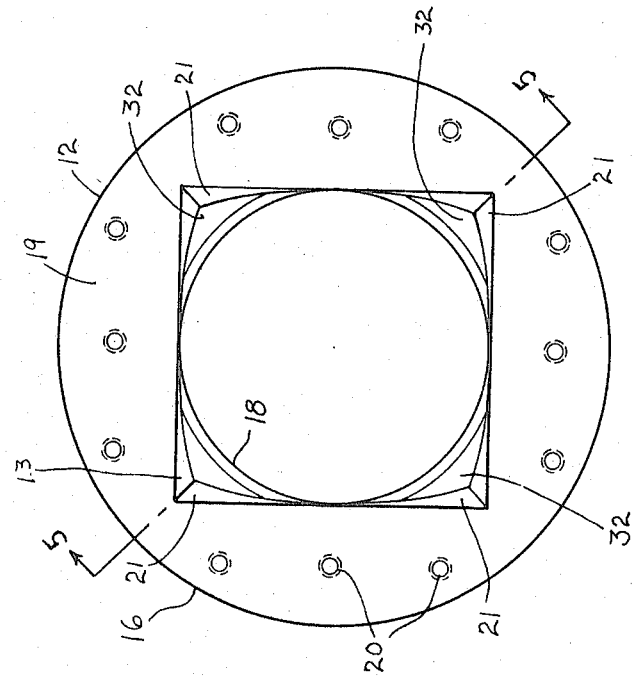

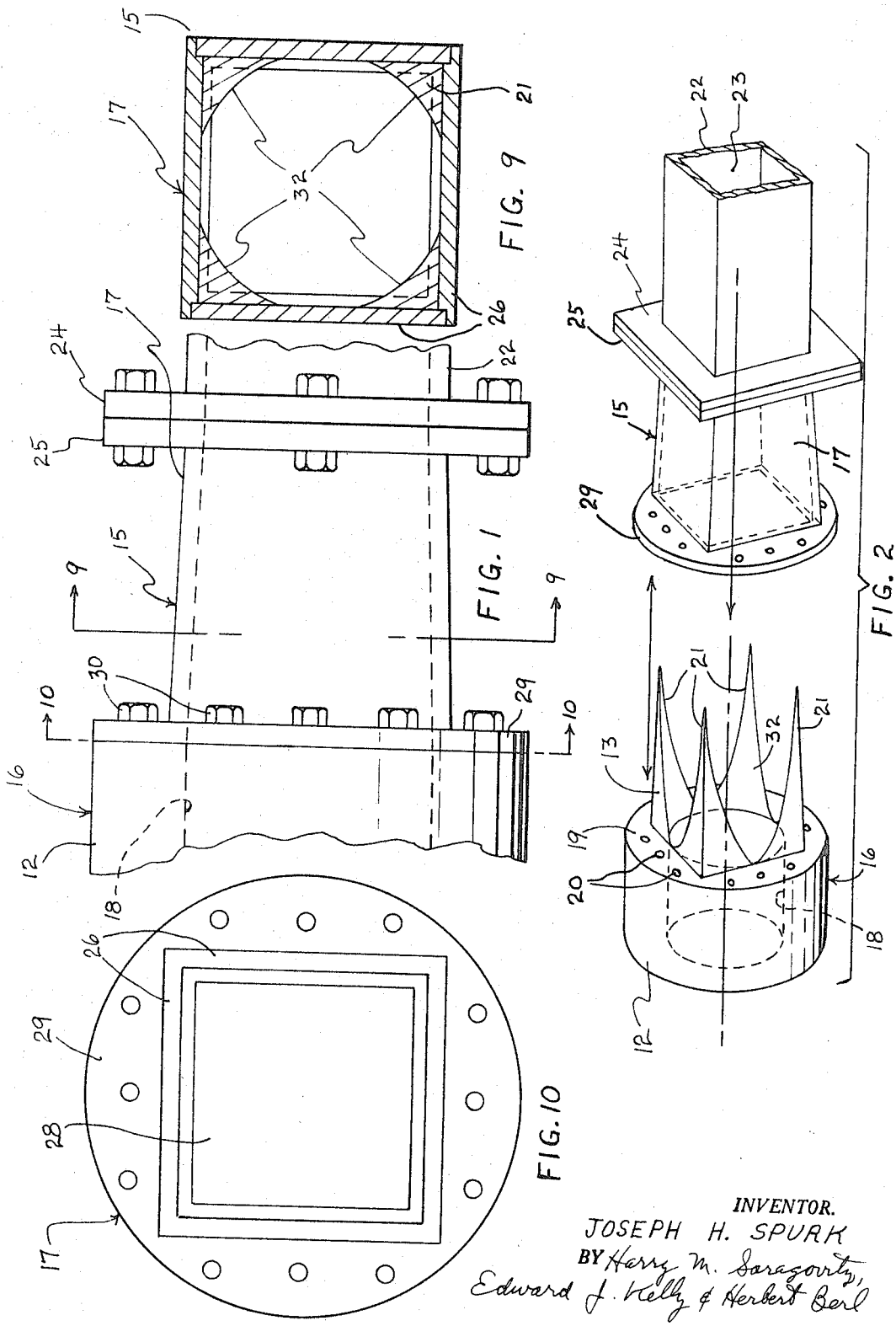

June 13, 1967 J. H. SPURK 3,324,534
METHOD OF FORMING A TRANSITION SECTION FOR CONNECTING
A CIRCULAR TUBE AND A NONCIRCULAR TUBE
Filed Aug. 21, 1964 3 Sheets-Sheet 2

INVENTOR.
JOSEPH H. SPURK
BY Harry M. Saragovitz
Edward J. Kelly & Herbert Berl
ATTORNEYS June 13, 1967  J. H. SPURK  3,324,534
METHOD OF FORMING A TRANSITION SECTION FOR CONNECTING
A CIRCULAR TUBE AND A NONCIRCULAR TUBE
Filed Aug. 21, 1964  3 Sheets-Sheet 3

INVENTOR.
JOSEPH H. SPURK
BY Harry M. Saragovitz,
Edward J. Kelly & Herbert Berl
ATTORNEYS United States Patent Office 3,324,534
Patented June 13, 1967

3,324,534
METHOD OF FORMING A TRANSITION SECTION FOR CONNECTING A CIRCULAR TUBE AND A NONCIRCULAR TUBE
Joseph H. Spurk, Darlington, Md., assignor to the United States of America as represented by the Secretary of the Army
Filed Aug. 21, 1964, Ser. No. 391,344
3 Claims. (Cl. 29—157)

The invention described herein, if patented, may be manufactured and used by or for the Government, for governmental purposes without the payment to me of any royalty thereon.

The invention relates to a method of making transition sections of tubing which are used to connect tubing of one cross section to tubing having a different cross section. More specifically the invention relates to a method of making such a section which connects tubing having a given cross sectional area to tubing of a different shape but of the same cross sectional area without changing the cross sectional area in the transition section.

In many gasdynamical or hydrodynamical applications it is necessary to connect a pipe or tube of a round cross section in end-to-end relation with a pipe or tube of a square or other symmetrical noncircular interior cross section having the same cross sectional area as the round pipe or tube. The transition between the two cross sectional shapes poses a mechanical problem insofar as the fabrication transition pipe or section is concerned. Often, in order to expedite the fabrication of this section, no care is taken normally to keep the cross sectional area constant throughout the length of the section. In such an instance, as the cross sectional area changes more or less abruptly and in an uncontrolled manner, serious pressure losses and boundary layer separation occur or it transforms the laminar boundary layer into a turbulent boundary layer. In supersonic flow it gives rise to compression waves and shocks which, by resultant reflection on the walls of the pipe, spread downstream of the transition section and affects the entire flow.

In instances where the tube or pipe of square cross section serves as a test chamber (as in the case for shock tubes, expansion tubes or the like) the entire operation of the facility may be adversely affected.

With the foregoing in view, it is an object of the invention to provide a method of making an improved transition section of the class described.

A further object is to provide a method of making such an improved transition section which is so formed as to maintain the cross sectional area of the pipes or tubes connected throughout the length of the section.

A further object is to provide a method of making such an improved transition section which maintains the cross sectional area of the connected pipes throughout its length by simple geometrical shapes which may be readily formed.

A further object is to provide a method of making a transition section such as that last described which is formed by modifying the adjacent ends of the pipes or tubes to be connected and then so connecting the modified ends together as to provide not only a uniform change of shape from one to the other but one which accurately maintains the cross sectional area throughout the length of the transition section thus created.

Other objects and advantages reside in the particular structure of the several elements of the invention, combinations and subcombinations of such elements, and /or in the particular method of forming the section, all of which will be readily apparent to those skilled in the art upon reference to the attached drawing and to the following specification wherein the invention is shown, described and claimed.

Figure 3:
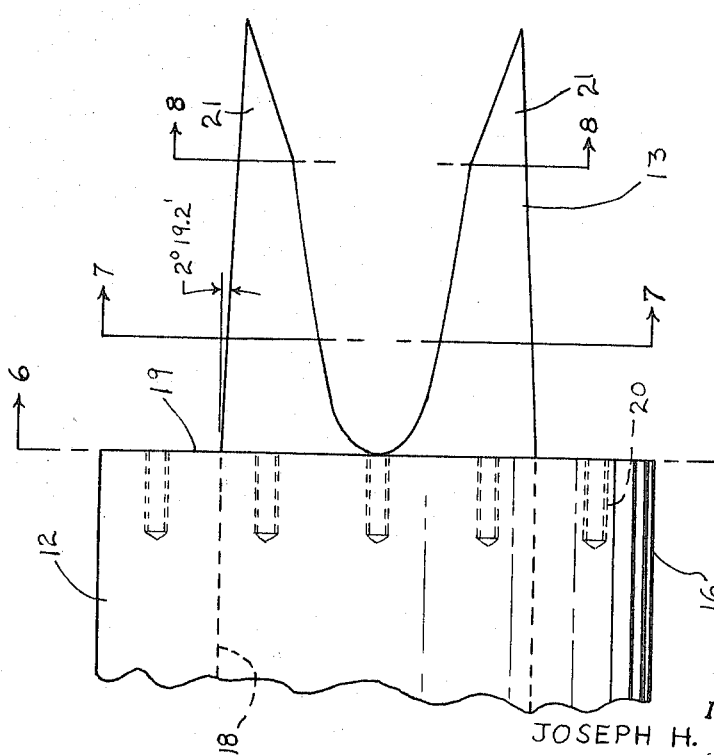
Figure 6:
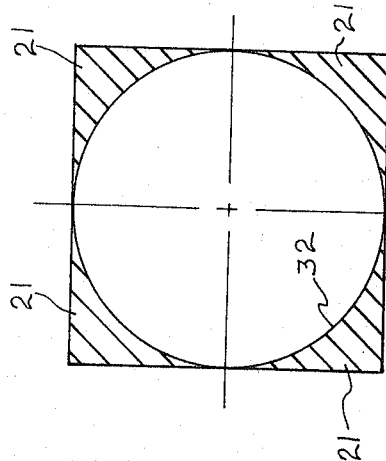
Figure 8:
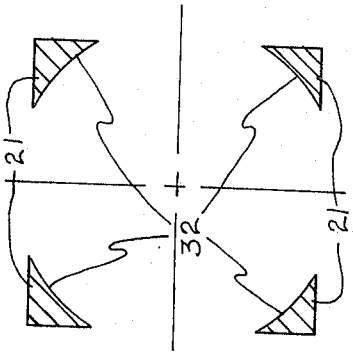
Figure 7:
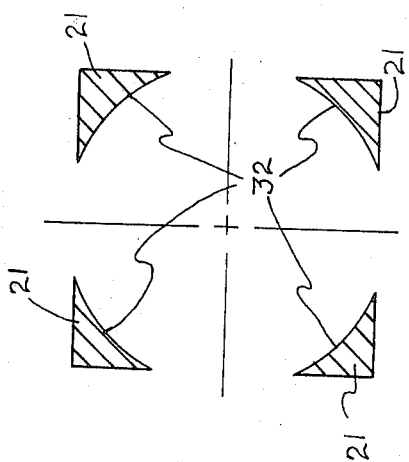
Figure 5:
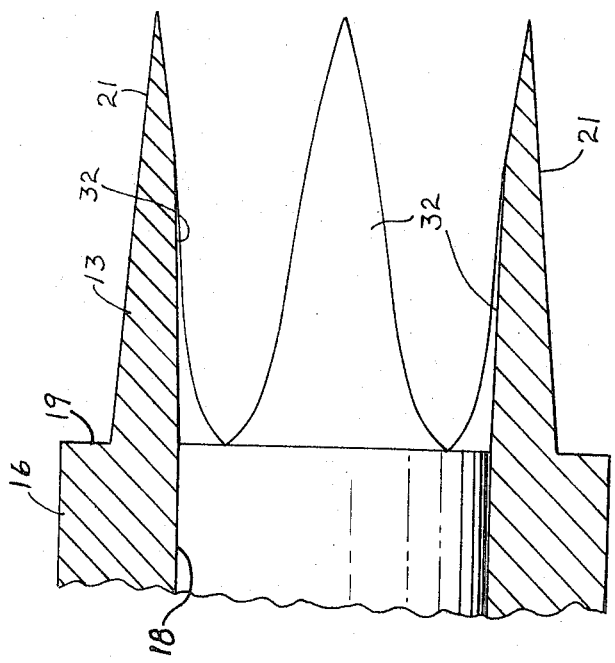

In the drawing:
FIGURE 1 is an elevational view of a completed transition section according to the invention showing the same coupling together two pipes of different cross section but having the same cross sectional area;
FIGURE 2 is an exploded perspective view of the two elements of the transitional section connected to their pipes but separate from each other;
FIGURE 3 is an elevational view of the plug element of the section;
FIGURE 4 is an end view of FIGURE 3 looking from the right;
FIGURE 5 is a diagonal longitudinal sectional view taken substantially on the plane of the line 5—5 of FIGURE 4;
FIGURES 6, 7 and 8 are transverse sectional views taken respectively on the planes of the lines 6—6, 7—7, and 8—8 of FIGURE 3;
FIGURE 9 is a transverse sectional view taken on the plane of the line 9—9 of FIGURE 1; and
FIGURE 10 is a transverse sectional view taken on the plane of the line 10—10 of FIGURE 1.

Referring specifically to the drawing, wherein like reference characters designate like parts in all views, and looking first to FIGURES 1 and 2, 15 designates generally a transition section according to the invention. The plug element of the invention is generally designated by 16 and the socket element by 17. The plug element 16 comprises a pipe 12 having a circular cross section including a bore 18 of like-shaped cross section and a known cross sectional area. One end of the pipe 12 is faced off to provide a truncated pyramid 13 of square cross section in the embodiment illustrated. An alternative procedure is to counterbore that portion of circular bore 18 of pipe 12 and then face off one end of pipe 12 to reduce pyramid 13 to four projections. As will appear later, other cross sectional shapes are contemplated. Such facing off of the pipe end provides a shoulder 19 for a purpose to be apparent hereinafter. The pipe 12 has a series of tapped holes 20 bored therein through the shoulder 19 to provide means for securing the socket section 17 thereto as will appear later.

That portion of the circular bore 18 of the pipe 12 which is within the truncated pyramid 13 is now counterbored by an appropriate tool having a cutting edge formed as a plane curve which enlarges the bore 18 to reduce the pyramid 13 to four projections 21 each of which has two exterior plane surfaces which intersect at an angle and an arcuate interior surface of revolution 32. Each projection tapers to a point at its free end which point is substantially in the plane of the frustum of the pyramid 13.

The socket element 17 of the transition section 15 in the embodiment illustrated, comprises a pipe 22 having a symmetrical, noncircular interior bore 23 which is of the same cross sectional area as that of bore 18 of the plug element. In this instance the bore 23 is square. A square flange 24 is formed on one end of pipe 22 for securing the same to a like flange 25 of the socket element 17. Such element may comprise four flat plates as 26 which are secured together and to the flange 25 in any suitable manner as by welds, not shown, so as to form a truncated pyramidal recess 28 which is complementary to the truncated pyramid 13 of the plug element 16 in shape, diameter and length whereby the latter is nested therein to complete the transition section 15, the interior diameter of the same varies constantly in shape from end to end but retains the same cross sectional area throughout its length, which area is the same as the like areas of the pipes 13 and 22. The socket element 17 may be secured to the pipe 13 in any suitable manner as by the provision of a circular flange 29 which corresponds in shape to the shoulder 19 whereby it may be secured thereto by machine screws 30 or by welding. After the elements 16 and 17 are nested together, they may be secured together in any suitable manner, not shown, as by welding, machine screws or the like.

The resultant transition section 15 permits the passage of fluids from pipe 12 to pipe 22 or vice versa smoothly without pressure changes or the resultant damage to the pipes. This is accomplished by the particular shape of the generating curve of the surface of revolution 32 of the bore of the pyramid 13 which when the transition is between a pipe of circular cross section and one of square cross section is according to the following formula:

$$r^* = f(r a l / L)$$

in which:
$r^*$ is the generating curve
$f$ is a mathematical symbol for a function
$r$ is the radius of the interior diameter of cylindrical pipe 12
$a$ is one-half the base length of pyramid 13
$l$ is the distance from the point where the round cross section changes into the square cross section
$L$ is the overall height of pyramid 13

From the foregoing it is seen that $r^*$ is a function of $ral/L$.

If a linear dependence of "$a$" from "$l$" is chosen as $$a = r - (r - a_{top}) l / L$$

then from geometric consideration follow two equations:

$$\cos \alpha/2 = \frac{a}{r^*}$$

$$\left(\frac{r}{r^*}\right)^2 = 1 - 2\left(\frac{\alpha^\circ}{180^\circ} - \frac{\sin \alpha}{\pi}\right)$$

wherein $\alpha$ is a parameter. These equations must be solved for $r/r^*$ as a function of $l/L$. This is done numerically and the result is given in Table 1.

TABLE 1

| l/L | r*/r | a/r |
|-----|------|-----|
| 0.0 | 1.0000 | 1.0000 |
| 0.1 | 1.0018 | ---------- |
| 0.2 | 1.0058 | ---------- |
| 0.3 | 1.0117 | ---------- |
| 0.4 | 1.0199 | ---------- |
| 0.5 | 1.0308 | ---------- |
| 0.6 | 1.0449 | ---------- |
| 0.7 | 1.0638 | ---------- |
| 0.8 | 1.0900 | ---------- |
| 0.9 | 1.1299 | ---------- |
| 1.0 | 1.2533 | 0.8862 |

To obtain dimensional values of $r^*$ versus $l$ follow the procedure below:

(a) Choose value of cross sectional area A (in this case 1 (foot)$^2$).

(b) Choose value for length of transition piece L (here taken to be 1 foot).

(c) It is $r^2\pi = A$ circular section. $4a^2_{top} = A$ square section. $r$ is then $$r = \sqrt{\frac{A}{\pi}} = 0.56419 \text{ [ft.]}$$

In the example $$a_{top} = 0.5\sqrt{A} = 0.5 \, [ft]$$

($a$ is half the base length of inner cross section of the truncated pyramid, at "top" of pyramid; this cross section is equal to that of the square pipe).

(d) Take Table 1, which gives $r^*/r$ as a function of $l/L$ and multiply first column by L (from step b above) to obtain a dimensional $l$. Multiply the second column $(r^*/r)$ by $r$ (from step c) to obtain a dimensional $r^*$.

Multiply the third column $a/r$ by $r$ to get the dimensional $a$ at top and base of pyramid. Table 1a shows the result for my example.

TABLE 1a

| l/L | r*/r | a/r | l [ft.] | r* [ft.] | a [ft.] |
|-----|------|-----|---------|----------|---------|
| 0.0 | 1.00000 | 1.0000 | 0.0 | 0.56419 | 0.56419 |
| 0.1 | 1.0018 | ---------- | 0.1 | 0.5621 | ---------- |
| 0.2 | 1.0058 | ---------- | 0.2 | 0.56746 | ---------- |
| 0.3 | 1.0117 | ---------- | 0.3 | 0.57079 | ---------- |
| 0.4 | 1.0199 | ---------- | 0.4 | 0.57542 | ---------- |
| 0.5 | 1.0308 | ---------- | 0.5 | 0.58197 | ---------- |
| 0.6 | 1.0449 | ---------- | 0.6 | 0.58952 | ---------- |
| 0.7 | 1.0638 | ---------- | 0.7 | 0.60019 | ---------- |
| 0.8 | 1.0900 | ---------- | 0.8 | 0.61497 | ---------- |
| 0.9 | 1.1299 | ---------- | 0.9 | 0.63748 | ---------- |
| 1.0 | 1.2533 | 0.8862 | 1.0 | 0.70710 | 0.5000 |

Broad general formulas applicable to symmetric, noncircular cross section pipes (i.e., those with regular polygonal cross sections), are worked out as follows.

The general formula for the linear dependence between $a$ and $l$ is chosen to be $$a = r - l/L(r - a_{top})$$

where $a$ is the perpendicular distance from the center of the cross section to the side of the polygon in accordance with the definition for the case of the square pipe.

From geometrical consideratiion follow two equations:

$$\cos\left(\frac{\alpha}{2}\right) = \left(\frac{a}{r^*}\right)$$

$$\left(\frac{r}{r^*}\right)^2 = 1 - \left(\frac{n}{2}\right)\left[\left(\frac{\alpha^\circ}{180^\circ}\right) - \left(\frac{\sin \alpha}{\pi}\right)\right]$$

where $n$ is the number of corners and $\alpha$ is a parameter. They must be solved simultaneously for $(r/r^*)$ as a function of $(l/L)$ for different polygons having $n$ corners.

The area of the circular cross section, A, is $A = \pi r^2$. The area of the polygon cross section, also equal to A, is $$A = a^2_{top} n \tan\left(\frac{180^\circ}{n}\right)$$

Therefore $$a_{top} = \left(\frac{r}{2}\right)\left\{\frac{\pi}{n \tan\left(\frac{180^\circ}{n}\right)}\right\}^{1/2}$$

TABLE 1b

| (l/L) | n=3 | n=4 | n=5 | n=6 |
|-------|------|------|------|------|
| 0 | 1.0000 | 1.0000 | 1.0000 | 1.0000 |
| .1 | 1.0038 | 1.0018 | 1.0011 | 1.0008 |
| .2 | 1.0118 | 1.0058 | 1.0035 | 1.0023 |
| .3 | 1.0246 | 1.0117 | 1.0072 | 1.0048 |
| .4 | 1.0421 | 1.0199 | 1.0119 | 1.0080 |
| .5 | 1.0647 | 1.0308 | 1.0187 | 1.0123 |
| .6 | 1.0952 | 1.0449 | 1.0270 | 1.0180 |
| .7 | 1.1360 | 1.0638 | 1.0381 | 1.0255 |
| .8 | 1.1922 | 1.0900 | 1.0538 | 1.0359 |
| .9 | 1.2815 | 1.1299 | 1.0779 | 1.0517 |
| 1.0 | 1.5551 | 1.2533 | 1.1495 | 1.0996 |

I claim:

1. The method of forming a transition section for connecting together a circular tube and a symmetrical noncircular tube each having the same cross sectional area, comprising the steps of facing off the periphery of one end of said circular tube to provide a symmetrical noncircular truncated pyramid of the same cross sectional shape as said noncircular tube, counterboring said end of said circular tube with a plane curve to provide a plurality of equi-spaced projections each having an inner surface comprising a segment of a surface of revolution and angularly disposed outer surfaces comprising the corners of said pyramid, flaring an end of said symmetrical noncircular tube to provide a hollow symmetrical noncircular truncated pyramidal body complementary to said pyramid, and securing said pyramid and pyramidal body together in nested coaxial relation whereby to provide a composite tapering inner surface for said transition section which has a constant cross sectional area throughout its length equal to the cross sectional area of each of said tubes.

2. The method of forming a transition section for connecting a circular tube and a square tube of like cross sectional areas, said section having a constantly varying internal cross section from end to end which maintains a uniform cross sectional area throughout its length which corresponds to the cross sectional area of each of said tubes; comprising the steps of facing off the periphery of a hollow cylindrical body having an internal cross sectional area corresponding to that said circular tube to provide a truncated pyramid, counterboring said pyramid from the truncated end thereof with a plane curve to provide a hollow circular body at one end with four equi-spaced projections projecting therefrom each having an arcuate inner surface comprising a segment of a surface of revolution and right angularly disposed outer surfaces comprising the corners of said pyramid, securing said projections in nested coaxial relation within a hollow square truncated pyramidal body complementary to said pyramid, said pyramidal body having a truncated frustum of the same size as said square tube.

3. The method of claim 1, wherein said surface of revolution has a generating curve according to the formula $$r^* = f(ral/L)$$

in which:
- $r^*$ is the generating curve;
- $f$ is a mathematical symbol for a function;
- $r$ is the radius of said hollow cylindrical body;
- $a$ is one-half the base length of the pyramidal body;
- $l$ is the distance from the point where the round cross section changes into the square cross section; and
- $L$ is the height of the pyramidal body.

References Cited
UNITED STATES PATENTS

| | | | |
|---|---|---|---|
| 1,860,521 | 5/1932 | Anderson | 285—177 X |
| 2,476,621 | 7/1949 | Okress | 285—176 X |
| 2,643,861 | 6/1953 | Losey | 285—176 X |

FOREIGN PATENTS

| | | |
|---|---|---|
| 1,194,927 | 11/1959 | France. |

CHARLIE T. MOON, *Primary Examiner.*

CARL W. TOMLIN, *Examiner.*

D. W. AROLA, *Assistant Examiner.*